July 8, 1941.  W. FRIEDRICH  2,248,226
NUT LOCKING DEVICE
Filed Sept. 6, 1938

INVENTOR
WALTER FRIEDRICH
BY
Karl A. Mayr
ATTORNEY

Patented July 8, 1941

2,248,226

UNITED STATES PATENT OFFICE 2,248,226

NUT LOCKING DEVICE

Walter Friedrich, Aue, Saxony, Germany

Application September 6, 1938, Serial No. 228,579
In Germany September 6, 1937

6 Claims. (Cl. 151—14)

Nut locking devices are known with flaps extending radially and engaging in the screw threads of the bolt and bent out of a disc whose outer edge has an upwardly bent flange which is constructed in the shape of a nut for the engagement of a spanner. For increasing the axial resiliency exerted on the screw threads of the bolt by the flaps it has also been proposed to arrange above the ring of flaps two straps which engage in a neighbouring winding of the screw thread in the bolt and thus increase the clamping effect of the ring of flaps.

In the first mentioned locking device the objection arises that the locking effect ceases the moment the mutual tension between the nut to be locked and the locking device does not exist anymore for example owing to the stretching of the bolt under violent vibrations. The second mentioned locking device is open to the objection that the additional straps are insufficiently connected with the ring of flaps so that their clamping effect is unsatisfactory. Furthermore, these locking devices require an additional working operation owing to the subsequent bending up of the two straps. When the workpiece to be locked is subjected to continual jigging and shaking movements, the locking means soon work loose, so that then also the tension between the flaps and the straps ceases. For these locking devices an excessive amount of material is required, quite apart from the complicated tools necessary for producing the locking device.

The invention differs from the known nut locking device in that the locking flaps engaging in the screw threads of the bolt are worked from a common perforated disc so that they are situated in several horizontal planes, the locking flaps in the same plane engaging in the same winding of the bolt thread. The lower ring of flaps therefore engages in the lower windings of the screw thread of the bolt and the ring of flaps thereover engages in the next higher winding of the screw thread of the bolt. According to the invention therefore the flaps are for example alternately bent upwards and downwards so that the adjacent flaps engage in neighbouring screw thread windings and thus hold the intermediate portion of the screw thread under axial tension.

An embodiment of the invention is illustrated by way of example in the accompanying drawing, in which—

Figure 3:
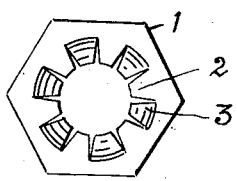
Fig. 3 shows the finished locking device in top plan view.
Figure 4:
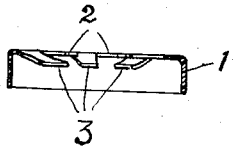
Fig. 4 is a diametral section of Fig. 3.

The locking device is formed from a disc which, according to Figs. 3 and 4, has on its periphery a sleeve-like flange 1 which is bent in the shape of a hexagonal nut. The flaps formed on the interior of the disc are now bent alternately upwards (2) and downwards (3). The flaps 2 therefore engage in one common winding of the screw thread of the bolt and the flaps 3 in another and lower situated winding thereof. In the example illustrated, the flaps, as above mentioned, are bent alternately upwards and downwards, namely by the height corresponding to the pitch of the screw thread. Three or more rings of flaps may also be provided which engage in a third or fourth winding of the screw thread of the bolt.

To ensure the engagement of the more sharply downwardly bent flaps 3 in the corresponding winding of the screw thread of the bolt it is evidently necessary to make these flaps longer than the others so as to thus have sufficient material available for bending them downwards. The flaps 2 which are bent downwards less sharply may also be made longer than necessary and subsequently curved so as to obtain an increased clamping effect in the screw thread of the bolt and an approximately horizontal engagement in the respective windings thereof.

Figure 1:
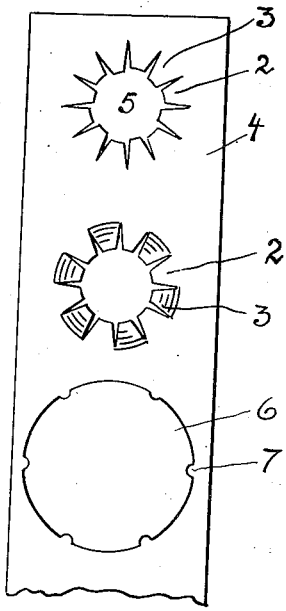
Fig. 1 shows the production of the locking device from a sheet metal strip.
Figure 2:
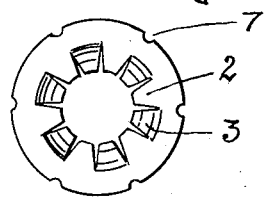
Fig. 2 shows the stamped out locking disc.

The production of the locking device is illustrated in Fig. 1 in which the nut locking device is produced from a band 4 in continuous operation by a suitable tool. First the hole 5 is punched with shaped periphery corresponding to the flaps 2 and 3 of different lengths. The flaps 2 and 3 are then formed, as described, by radial incisions and bent alternately downwards to different levels. In the next stage the ring of flaps thus produced is punched out of the band material by the punch 6 with corresponding recesses 7. These recesses 7 are necessary for the production of the flange 1 so as to obtain the nut shape for the engagement of a spanner. The punched out disc according to Fig. 2, is then provided with the bent up flange 1 in the next stage, after which the locking device is ready for use. Due to the alternate upward and downward bending of the the flaps 2 and 3 from the common disc, whose edge becomes very rigid, it is possible, contrary to the known locking devices, to punch the flange not by bending up six flaps but by drawing from the solid material of the disc in a stamping operation.

The locking device operates in the following manner:—If it is screwed on to a bolt and pressed against the nut to be locked by means of a spanner, the lower flaps press strongly against the corresponding winding of the screw thread, whereas the flaps 2 bear resiliently against the next higher winding and thus considerably increase the clamping effect of the locking device. Therefore, both rings of flaps, by strong radial pressure and by resiliency and by friction with the thread windings of the screw bolt, lock the nut against accidental loosening and unscrewing, even if the work-piece to be protected is subjected to continual vibrations and jigging movements. As the ring of flaps directed towards the nut to be locked has to exert the main clamping effect by pressing into the corresponding winding of the screw thread, it is advisable to make the flaps of this ring, that is the flaps 2, somewhat wider than the flaps 3 which have only to produce an additional resilient locking effect.

By a suitable choice of the material used, the locking device according to the invention may be made for any kind and pitch of screw thread from the finest to the coarsest. The inner edge of the flaps, especialy in the case of fine threads, may be treated so as to avoid damaging of the screw thread on the screw bolt. As all the rings of flaps extend from the same disc plane reinforced by flange 1, the intrinsic strength of the new locking device is very considerable, and the locking device can be screwed home with a spanner without any fear of tearing the disc. By the mutual clamping of the screw thread windings it is moreover impossible for the nut to be locked to work loose due to stretching of the screw bolt under continual vibrations.

I claim:

1. A nut locking device made of sheet metal and having a plane annular portion, a plurality of flap portions extending radially inward from and being positioned in substantially the same plane as said annular portion, other flap portions extending radially inward from said annular portion and being interspersed between said first mentioned flap portions and being inclined with respect to the plane of said annular portion and to said first mentioned flap portions, all said flap portions having inner edges disposed on an imaginary cylinder having an axis disposed rectangularly to and coaxially with said annular portion, and said inner edges being adapted to engage the threads of a threaded bolt member.

2. A nut locking device made of sheet metal and having a plane annular portion, a plurality of flap portions extending radially inward from and being positioned substantially in the same plane as said annular portion, other flap portions extending radially inward from said annular portion and being interspersed between said first mentioned flap portions and diverging from the plane of said annular portion and from said first mentioned flap portions, all said flap portions having inner edges disposed on an imaginary cylinder having an axis disposed rectangularly to and coaxially with said annular portion, said inner edges being adapted to engage the threads of a threaded bolt member, and a plurality of flap portions extending outward from said annular portion and being bent along straight lines to form right angles with said annular portion.

3. A nut locking device made of sheet metal and having a plane annular portion, a plurality of flap portions extending radially inward from and being positioned in substantially the same plane as said annular portion, other flap portions extending radially inward from said annular portion and being interspersed between said first mentioned flap portions and being bent out of the plane of said annular portion and of said first mentioned flap portions, all said flap portions having inner edges disposed on an imaginary cylinder having an axis positioned perpendicularly to and coaxially with said annular portion, said inner edges being adapted to engage the threads of a threaded bolt member, a plurality of recess portions in the outer rim of said annular portion, and substantially circle-segment shaped portions disposed between said recess portions and being bent along straight lines to form right angles with said annular portion.

4. The method of producing a nut locking device of the type described, comprising the step of stamping a hole into a sheet metal work piece, making incisions extending radially outward from said hole and terminating on a circle concentric with said hole and thereby producing a plurality of flap portions extending toward said hole, bending every other of said flap portions out of the plane of said work piece but keeping it substantially parallel thereto, and stamping said device out of said work piece along an annular line concentric with said hole and equidistantly spaced from the outer ends of said incisions to form a plane annular portion from which said flaps extend inward.

5. The method of producing a nut locking device of the type described, comprising the step of stamping a hole into a sheet metal work piece, making incisions extending radially outward from said hole and terminating on a circle concentric with said hole and thereby producing a plurality of flap portions extending toward said hole, bending every other of said flap portions out of the plane of said work piece but keeping it substantially parallel thereto, stamping said device out of said work piece along a substantially annular line concentric with said hole and equidistantly spaced from the outer ends of said incisions to form a plane annular portion from which said flaps extend inward, and bending circle segment portions of said annular portion along straight lines to form right angles with said plane annular portion.

6. The method of producing a nut locking device of the type described, comprising the step of stamping a hole into a sheet metal work piece, making incisions extending radially outward from said hole and terminating on a circle concentric with said hole and thereby producing a plurality of flap portions extending toward said hole, bending a plurality of said flap portions out of the plane of said work piece but keeping said last mentioned portions in substantially parallel relation to the work piece, and stamping said device out of said work piece along an annular line concentric with said hole and equidistantly spaced from the outer ends of said incisions to form a plane annular portion from which said flaps extend inward.

WALTER FRIEDRICH.